United States Patent
van Schalkwyk

(10) Patent No.: US 11,040,375 B2
(45) Date of Patent: Jun. 22, 2021

(54) BUNK CLEANER SYSTEM AND METHOD OF USE

(71) Applicant: Willem van Schalkwyk, Sunray, TX (US)

(72) Inventor: Willem van Schalkwyk, Sunray, TX (US)

( * ) Notice: Subject to any disclaimer, the term of this patent is extended or adjusted under 35 U.S.C. 154(b) by 294 days.

(21) Appl. No.: 16/394,293

(22) Filed: Apr. 25, 2019

(65) Prior Publication Data

US 2020/0338603 A1  Oct. 29, 2020

(51) Int. Cl.
 *B08B 1/00* (2006.01)
 *A01K 5/01* (2006.01)

(52) U.S. Cl.
 CPC .............. *B08B 1/005* (2013.01); *B08B 1/008* (2013.01); *A01K 5/01* (2013.01)

(58) Field of Classification Search
 CPC ............ B08B 1/005; B08B 1/008; A01K 5/01
 See application file for complete search history.

(56) References Cited

U.S. PATENT DOCUMENTS

| | | | | |
|---|---|---|---|---|
| 3,611,465 A | * | 10/1971 | Rasmussen | A01K 5/01 15/56 |
| 3,643,274 A | * | 2/1972 | Hodges | A01K 5/01 15/56 |
| 3,778,857 A | * | 12/1973 | Hughes | A01K 5/01 15/4 |
| 3,845,516 A | * | 11/1974 | Abbott | A01K 31/04 15/93.3 |
| 3,845,517 A | * | 11/1974 | Harris | A01K 31/04 15/93.3 |
| 4,543,678 A | * | 10/1985 | Cox | A01K 5/01 15/56 |
| 4,830,748 A | * | 5/1989 | Hall | B01D 21/0006 15/246.5 |
| 6,318,298 B1 | * | 11/2001 | Nonay | A01K 13/004 119/14.18 |
| 6,951,253 B1 | * | 10/2005 | Linsmeier | A01K 1/01 172/110 |
| 7,624,520 B2 | * | 12/2009 | Gordon | E02F 3/841 172/815 |
| 8,393,040 B2 | * | 3/2013 | Linsmeier | B08B 9/08 15/93.1 |
| 8,561,324 B1 | * | 10/2013 | Kersten | A01K 1/015 37/105 |

* cited by examiner

*Primary Examiner* — Marc Carlson
(74) *Attorney, Agent, or Firm* — Shannon Warren

(57) ABSTRACT

A bunk cleaner assembly for selectively adjusting a pitch, a roll and a height adjustment of a scoop assembly for cleaning a trough of a feed bunk. The bunk cleaner assembly comprises a frame portion, a swinging arm assembly, the scoop assembly, and a utility vehicle. The frame portion is configured in attaching the swinging arm assembly and the utility vehicle to one another. The swinging arm assembly comprise a hinge assembly.

24 Claims, 17 Drawing Sheets

BUNK CLEANER SYSTEM AND METHOD OF USE

CROSS-REFERENCE TO RELATED APPLICATIONS

Not applicable.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

No prior art is known to the Applicant.

BRIEF SUMMARY OF THE INVENTION

A bunk cleaner assembly for selectively adjusting a pitch, a roll and a height adjustment of a scoop assembly for cleaning a trough of a feed bunk.

Said bunk cleaner assembly comprises a frame portion, a swinging arm assembly, said scoop assembly, and a utility vehicle. Said frame portion is configured in attaching said swinging arm assembly and said utility vehicle to one another. Said swinging arm assembly comprise a hinge assembly. Said frame portion comprises a horizontal frame portion, a vertical frame portion, and a vehicle receiver bracket. Said frame portion comprise a first end, and a second end. Said hinge assembly attaches to said first end of said frame portion. Said vehicle receiver bracket is at said second end of said frame portion. said frame portion further comprises said vehicle receiver bracket configured to selectively attach said frame portion to said utility vehicle. Said frame portion is configured to extend said swinging arm assembly alongside of said utility vehicle and above said feed bunk. Said swinging arm assembly comprises said hinge assembly, a swing arm assembly and a scoop portion. Said hinge assembly is rotatably attached to said frame portion. Said swing arm assembly connects said hinge assembly to said scoop portion and hangs substantially down from said hinge assembly. Said scoop portion comprises a front edge, two sides, a scoop cavity and a back end. Said scoop portion is configured to scoop debris from said trough of said feed bunk. Said swinging arm assembly with said scoop assembly is configured to selectively rotate on a swing axis. Said swinging arm assembly freely rotates around said swing axis through a swinging range of motion. Said bunk cleaner assembly is configured to selectively change said roll with said swinging range of motion, said pitch with a forward pitch range of motion and a rear pitch range of motion, and said height adjustment with a vertical movement. Said swinging arm assembly freely rotates around said swing axis through said swinging range of motion between a leveled configuration, and an unleveled configuration. Said bunk cleaner assembly is adapted for altering a scoop pitch of said scoop assembly relative to a level pitch. Said bunk cleaner assembly comprises a forward pitch axis and a rear pitch axis about which said scoop portion can be rotated to said scoop pitch. Said forward pitch axis comprises a rotating axis where one or more lower brackets attach to said utility vehicle. Said rear pitch axis comprises a rotating axis at a joint between an arm and a chassis of said utility vehicle. Said forward pitch range of motion is defined as a movement of said bunk cleaner assembly around said forward pitch axis. Said rear pitch range of motion comprises a movement of said arm relative to said chassis. By adjusting said scoop pitch, said front edge with a beveled edge can be selectively adjusted to scrape debris from said trough of said feed bunk. Said swinging arm assembly comprises an adjustable vertical sliding assembly slidably attaching said swing arm assembly and said scoop assembly of said swinging arm assembly to one another along a vertical movement path to provide said vertical movement for said scoop assembly.

Next, said bunk cleaner assembly for selectively adjusting said scoop assembly for cleaning said trough of said feed bunk. Said bunk cleaner assembly comprises said frame portion, said swinging arm assembly, said scoop assembly, and said utility vehicle. Said frame portion is configured in attaching said swinging arm assembly and said utility vehicle to one another. Said swinging arm assembly comprise said hinge assembly. Said frame portion comprises said horizontal frame portion, said vertical frame portion, and said vehicle receiver bracket. Said frame portion comprise said first end, and said second end. Said hinge assembly attaches to said first end of said frame portion. Said vehicle receiver bracket is at said second end of said frame portion. said frame portion further comprises said vehicle receiver bracket configured to selectively attach said frame portion to said utility vehicle. Said frame portion is configured to extend said swinging arm assembly alongside of said utility vehicle and above said feed bunk. Said swinging arm assembly comprises said hinge assembly, said swing arm assembly and said scoop portion. Said hinge assembly is rotatably attached to said frame portion. Said swing arm assembly connects said hinge assembly to said scoop portion and hangs substantially down from said hinge assembly. Said scoop portion comprises said front edge, said two sides, said scoop cavity and said back end. Said scoop portion is configured to scoop debris from said trough of said feed bunk. Said swinging arm assembly with said scoop assembly is configured to selectively rotate on said swing axis. Said swinging arm assembly freely rotates around said swing axis through said swinging range of motion.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
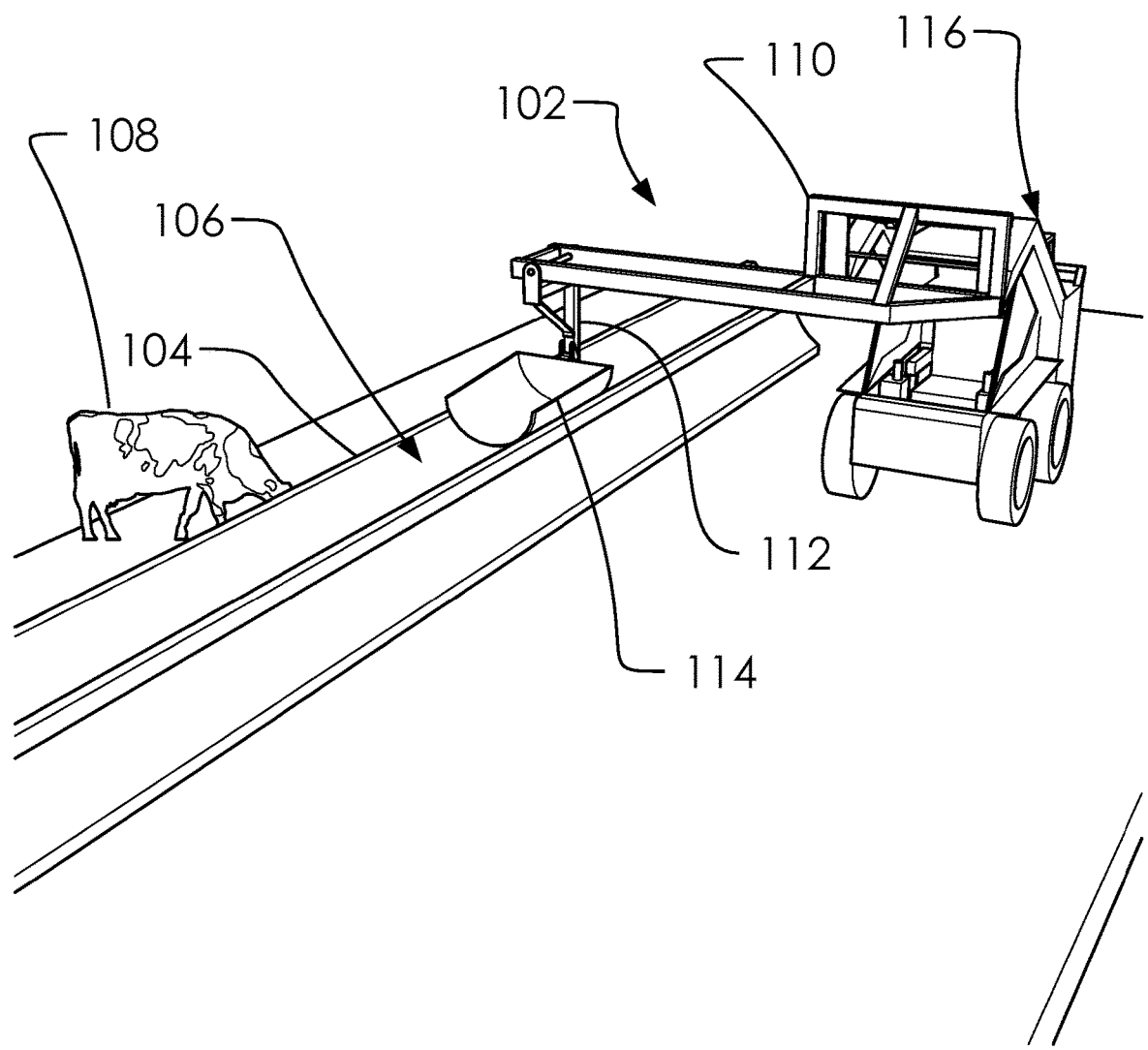
FIG. 1 illustrates a perspective overview of a bunk cleaner assembly 102.

FIG. 1 illustrates a perspective overview of a bunk cleaner assembly 102.

In one embodiment, said bunk cleaner assembly 102 can be used to clean out a feed bunk 104 having a trough 106 for feeding a livestock 108 or other animals.

In one embodiment, said bunk cleaner assembly 102 can comprise a frame portion 110, a swinging arm assembly 112 and a scoop assembly 114.

Said bunk cleaner assembly 102 can be configured to selectively attach to a utility vehicle 116 such as a skid loader.

Figure 2:
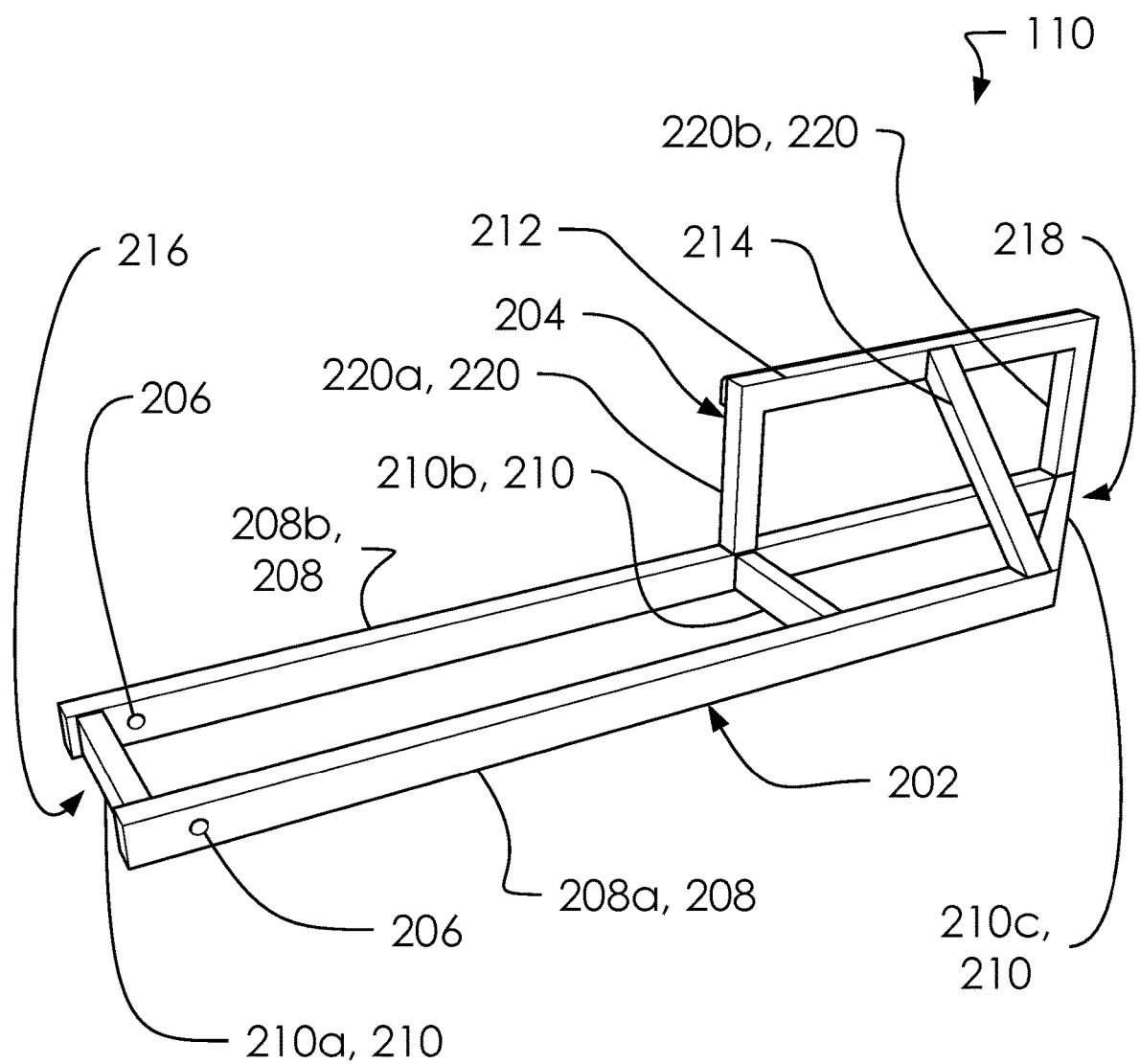
FIG. 2 illustrates a perspective overview of a frame portion 110.

FIG. 2 illustrates a perspective overview of said frame portion 110.

In one embodiment, said frame portion 110 can comprise a horizontal frame portion 202, a vertical frame portion 204 and two axis aperture holes 206. In one embodiment, said horizontal frame portion 202 can comprise two or more bars 208 (which can comprise at least a first bar 208a and a second bar 208b), and two or more support bars 210 (which can comprise at least a first support bar 210a, a second support bar 210b, and a third bar support 210c). Said vertical frame portion 204 can comprise a portion of said first bar 208a and an upper horizontal bar 212. In one embodiment, said horizontal frame portion 202, and said vertical frame portion 204 can be supported and connected to one another with a transverse support bar 214.

In one embodiment, said two axis aperture holes 206 can be aligned with one another at a first end 216 of said frame portion 110, said upper horizontal bar 212 can be attached at a second end 218 of said frame portion 110.

In one embodiment, said two or more support bars 210 are spaced between said first end 216, and said second end 218 and support said first bar 208a, and said second bar 208b. In one embodiment, said first bar 208a, and said second bar 208b are substantially parallel. In one embodiment, said first bar 208a is shorter than said second bar 208b; wherein, said two or more bars 208 align evenly at said first end 216 but said second bar 208b comes up short at said second end 218; further wherein, said third bar support 210c connects said first bar 208a, and said second bar 208b at said second end 218 at a nonparallel angle.

In one embodiment, said upper horizontal bar 212 and said second bar 208b are substantially parallel with one another and perpendicular to a vertical support bars 220.

As viewed from said first end 216, said frame portion 110 forms an "L" shape with said horizontal frame portion 202, and said vertical frame portion 204 forming the two parts of the "L", as illustrated.

In one embodiment, said frame portion 110 can be useful in attaching said swinging arm assembly 112, and said utility vehicle 116 to one another. In this way, said frame portion 110 can take on various shapes according to its design objective to link said swinging arm assembly 112, and said utility vehicle 116. Another design objective is to extend said two axis aperture holes 206 alongside of said utility vehicle 116 and above said feed bunk 104.

Figure 3A:
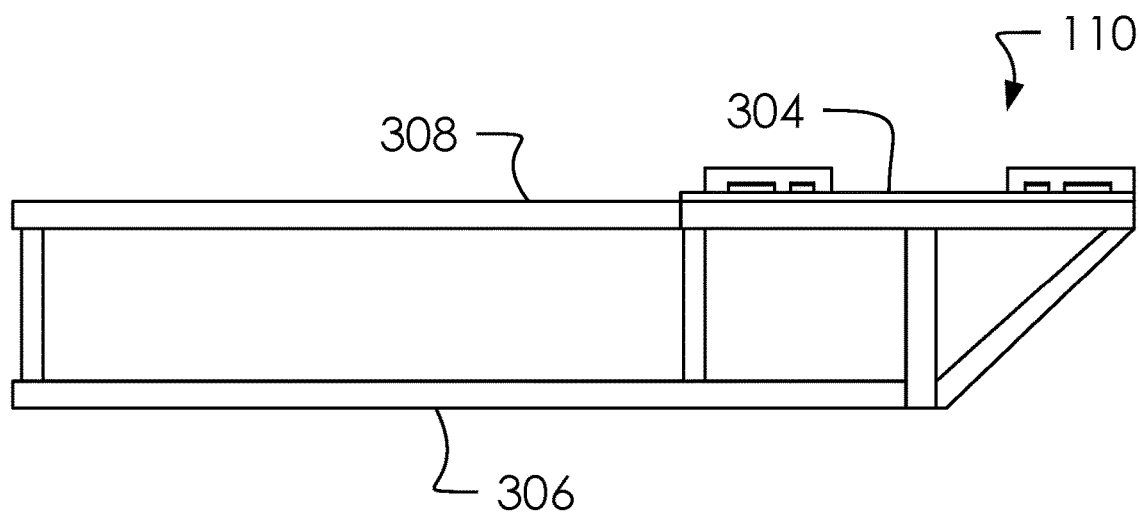
FIGS. 3A and 3B illustrate an elevated top view and bottom view of said frame portion 110.
Figure 3B:
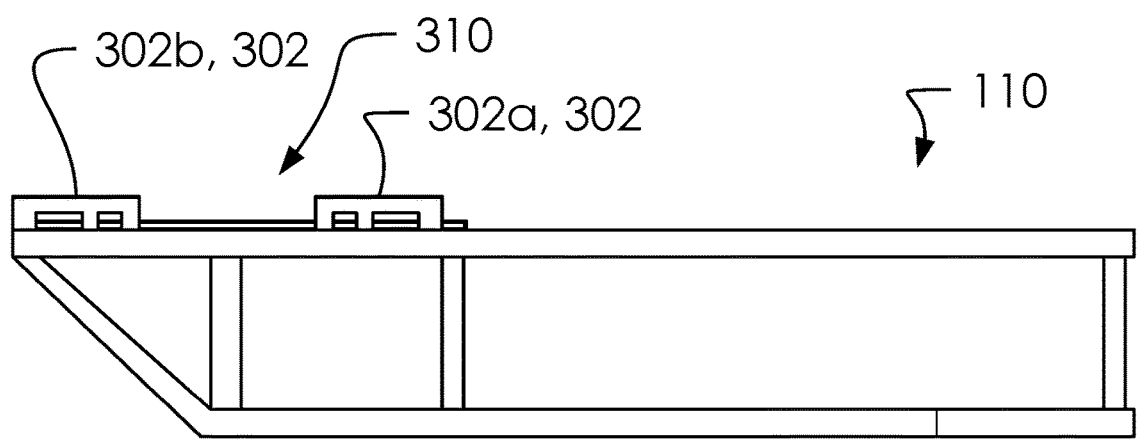

FIGS. 3A and 3B illustrate an elevated top view and bottom view of said frame portion 110.

In one embodiment, said frame portion 110 can comprise one or more lower brackets 302 (which can comprise a first lower bracket 302a and a second lower bracket 302b), an upper bracket 304, a front 306 and a back 308.

In one embodiment, said one or more lower brackets 302, and said upper bracket 304 comprise a vehicle receiver bracket 310. In one embodiment, said vehicle receiver bracket 310 can be adapted to selectively receive a portion of said utility vehicle 116 and support said bunk cleaner assembly 102 thereupon, as is known in the art.

Figure 4A:
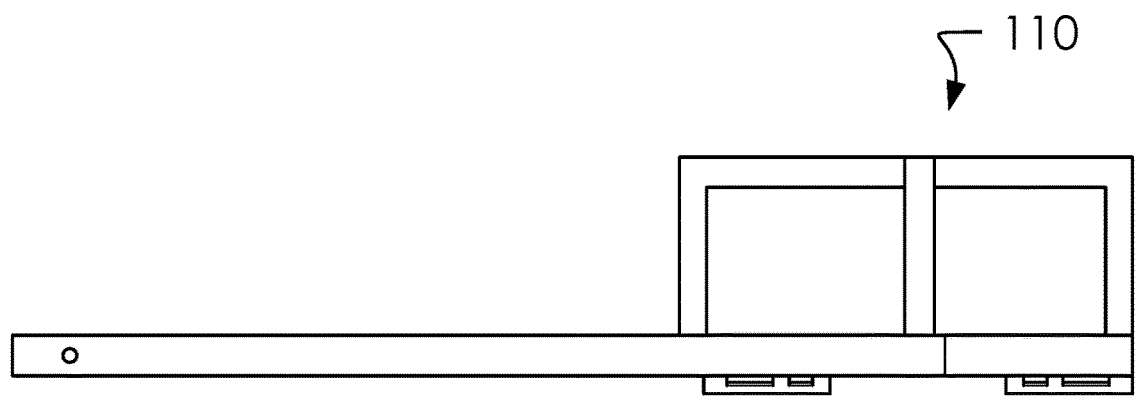
FIGS. 4A and 4B illustrate an elevated back and front view of said frame portion 110.
Figure 4B:
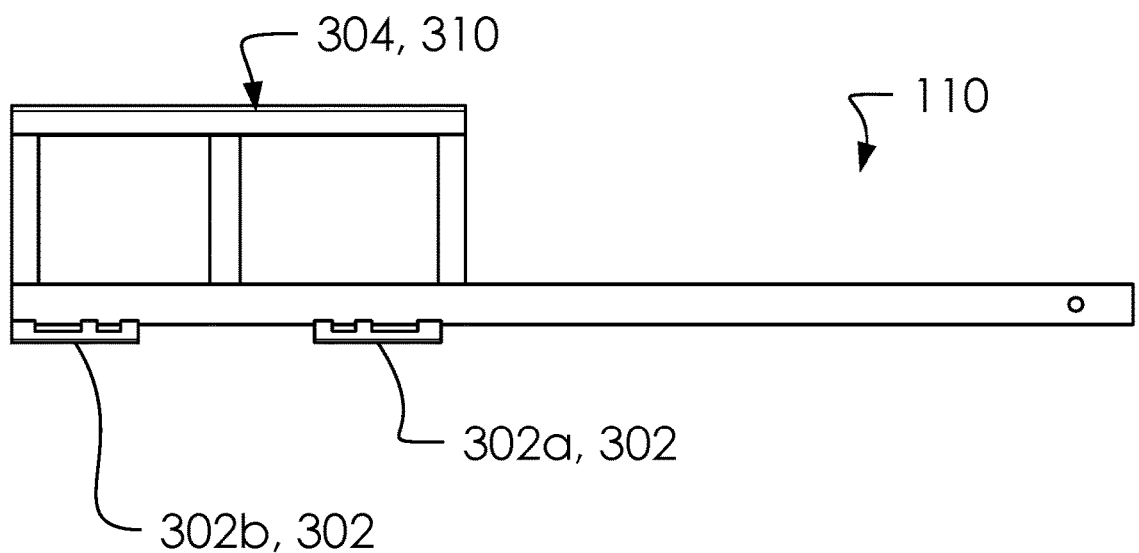

FIGS. 4A and 4B illustrate an elevated back and front view of said frame portion 110.

Figure 5:
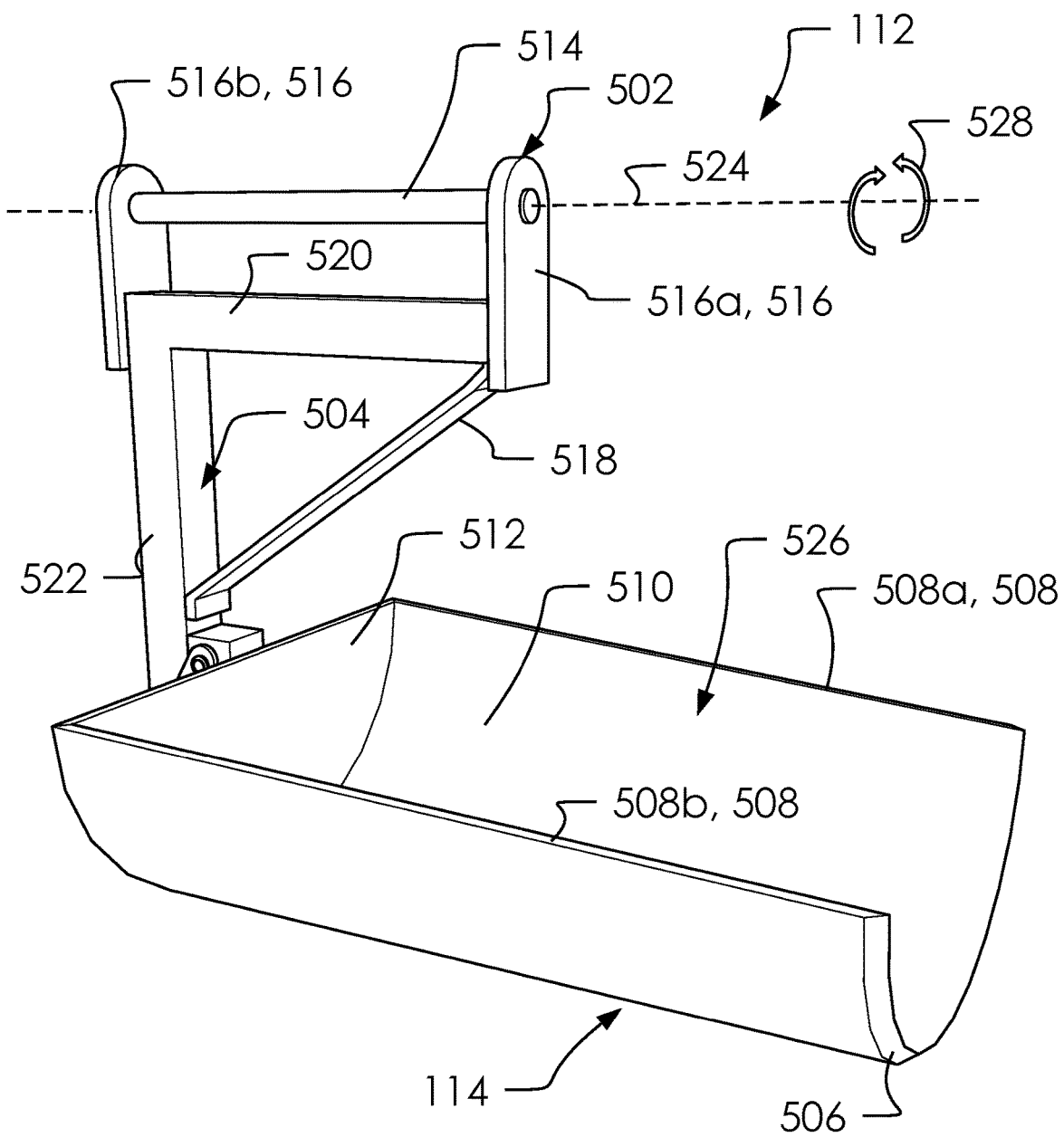
FIG. 5 illustrates a perspective overview of a swinging arm assembly 112.

FIG. 5 illustrates a perspective overview of said swinging arm assembly 112.

In one embodiment, said swinging arm assembly 112 can comprise a hinge assembly 502 and a swing arm assembly 504.

Said scoop assembly 114 can comprise a scoop portion 526 having a front edge 506, two sides 508 (comprising a first two side 508a, and a second two side 508b), a scoop cavity 510 and a back end 512.

Said hinge assembly 502 can comprise a hinge bar 514 and a two end caps 516 (comprising a first end cap 516a, and a second end cap 516b). Said swing arm assembly 504 can comprise a swing arm transverse brace 518, a horizontal portion 520 and a vertical portion 522.

In one embodiment, said swinging arm assembly 112 with said scoop assembly 114 can selectively rotate on a swing axis 524; wherein said swing axis 524 represents said hinge bar 514 of said swinging arm assembly 112 attached to said two axis aperture holes 206 of said frame portion 110. In one embodiment, said swing axis 524 is aligned with direction of vehicle travel 1702 of said utility vehicle 116.

In one embodiment, said swinging arm assembly 112 can rotate around said swing axis 524 through a swinging range of motion 528.

Figure 6:
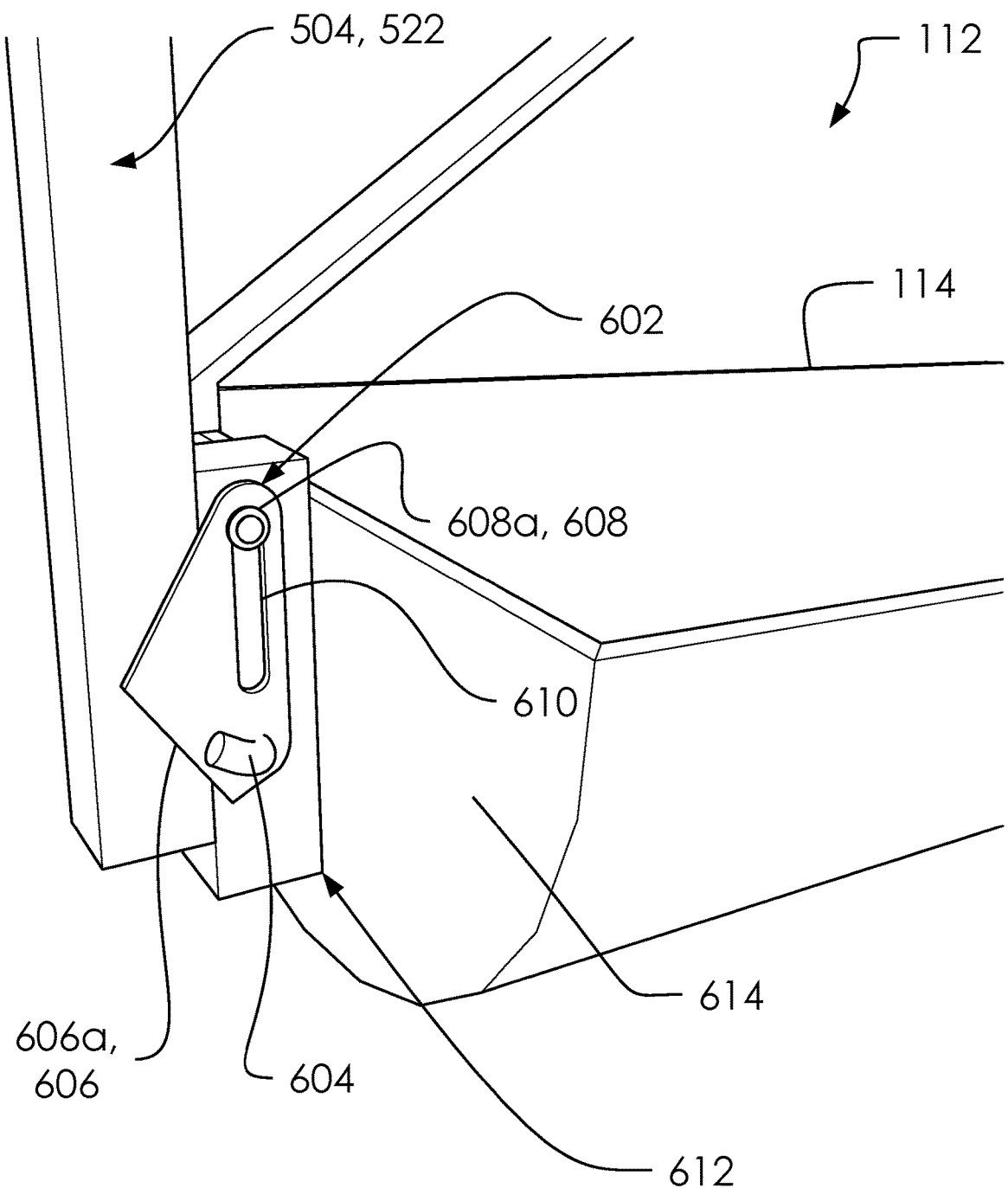
FIG. 6 illustrates a perspective rear side view of said swinging arm assembly 112.

FIG. 6 illustrates a perspective rear side view of said swinging arm assembly 112.

In one embodiment, said swinging arm assembly 112 can comprise an adjustable vertical sliding assembly 602 which can comprise a pin 604, two side plates 606, and an upper elongated slot 610. Said two side plates 606 can comprise a first side plate 606*a*, and a second side plate 606*b*.

Said scoop assembly 114 can comprise two side fasteners 608, a rear spacer 612, and said scoop portion 526 having a back side 614. Said two side fasteners 608 can comprise a first side fastener 608*a*, and a second side fastener 608*b*.

Each of said two side plates 606 can comprise said upper elongated slot 610 configured to hold a portion of said two side fasteners 608 and allow said scoop assembly 114 to slide along a path defined by said upper elongated slot 610 as said two side fasteners 608 slide therethrough.

Figure 7:
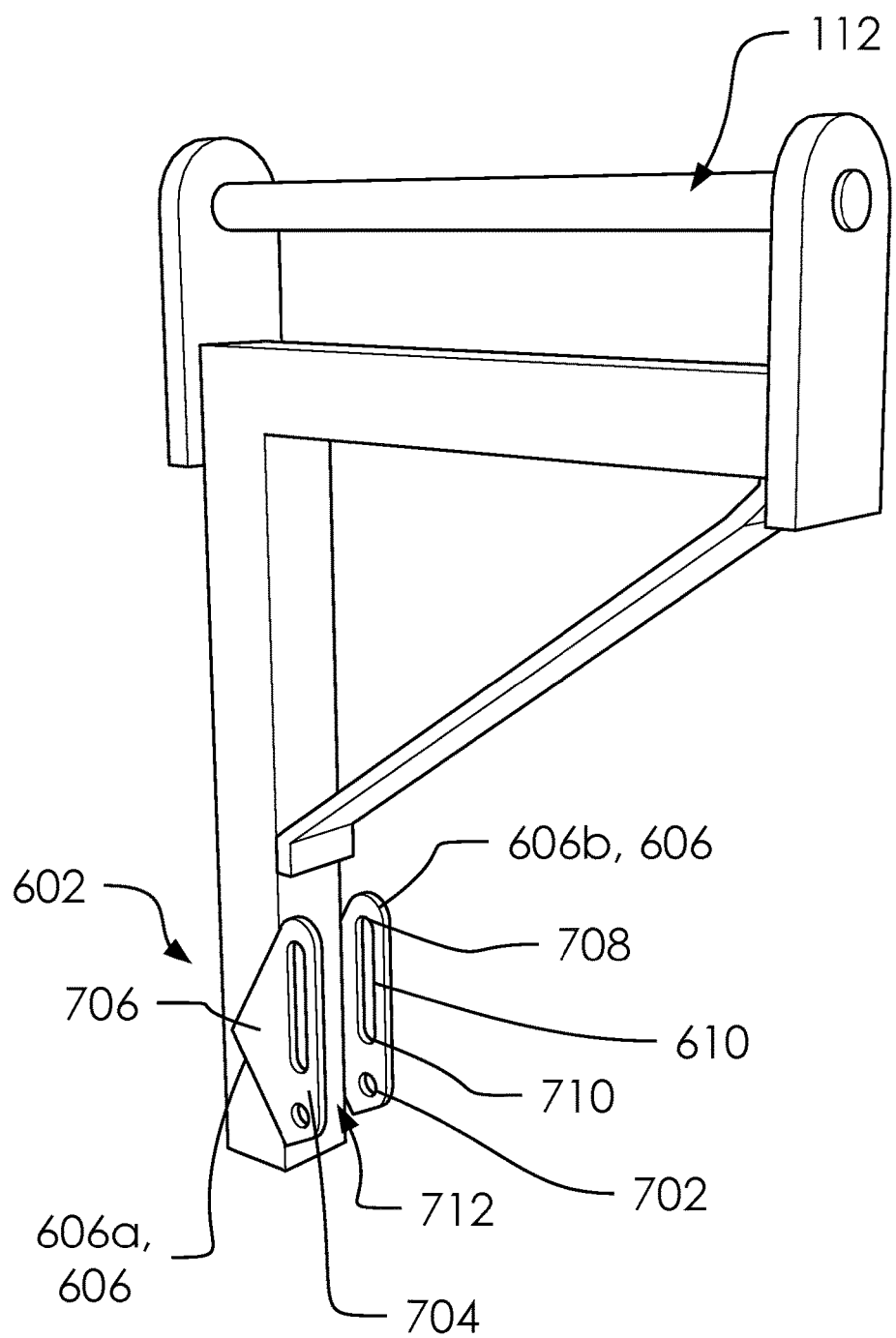
FIG. 7 illustrates a perspective overview of an adjustable vertical sliding assembly 602 on said swinging arm assembly 112.

FIG. 7 illustrates a perspective overview of said adjustable vertical sliding assembly 602 on said swinging arm assembly 112.

In one embodiment, each of said two side plates 606 can comprise said upper elongated slot 610, a pin aperture 702, a front portion 704 and a rear portion 706. In one embodiment, said upper elongated slot 610 can comprise an upper end 708 and a lower end 710.

In one embodiment, said swinging arm assembly 112 can comprise a spacer gap 712 between said two side plates 606. In one embodiment, said two side plates 606 can attach on either side of said vertical portion 522 with said rear portion 706 and said front portion 704 can extend out on either side of said spacer gap 712.

Figure 8A:
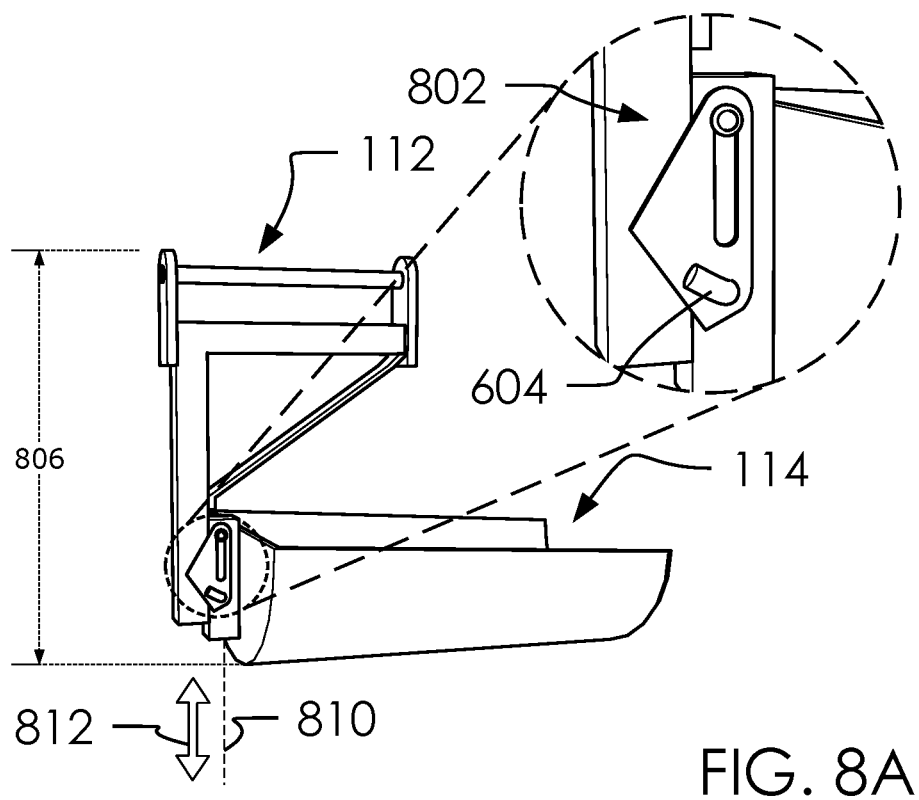
FIGS. 8A and 8B illustrate a perspective overview of said swinging arm assembly 112 in a locked upper configuration 802 and an unlocked lower configuration 804.
Figure 8B:
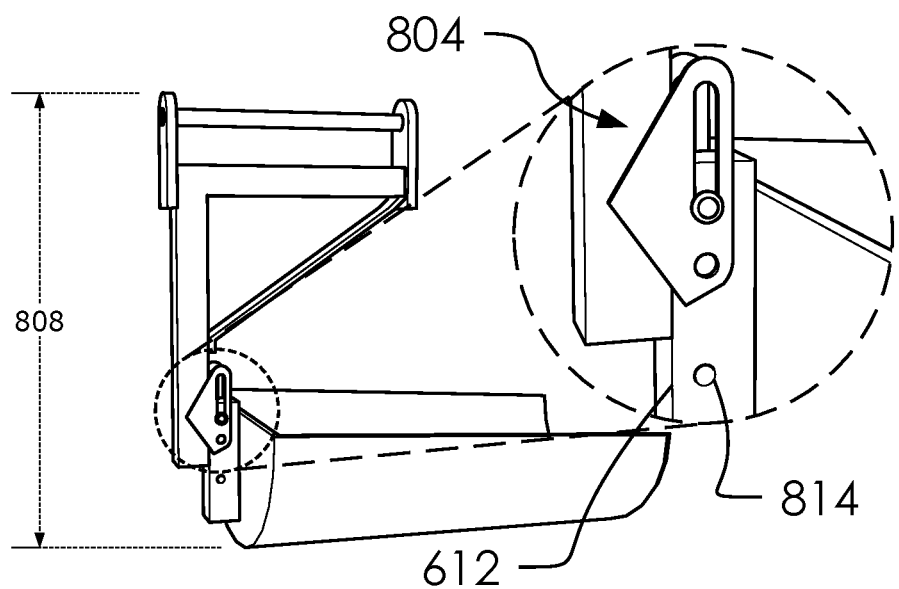

FIGS. 8A and 8B illustrate a perspective overview of said swinging arm assembly 112 in a locked upper configuration 802 and an unlocked lower configuration 804.

Said swinging arm assembly 112 in said locked upper configuration 802 and said unlocked lower configuration 804 can comprise a locked height 806 and a maximum height 808.

Said locked upper configuration 802 can comprise said two side fasteners 608 at said upper end 708 of said upper elongated slot 610, and said pin 604 in said pin aperture 702.

Said unlocked lower configuration 804 can comprise said scoop assembly 114 slid all the way down with said two side fasteners 608 at said lower end 710 of said upper elongated slot 610.

With said pin 604 removed from said pin aperture 702, said swinging arm assembly 112, and said scoop assembly 114 move freely relative to one another, accordingly, said scoop assembly 114 has vertical movement freedom.

Said scoop assembly 114 comprises a vertical movement path 810 allowing a vertical movement 812 as defined by said upper elongated slot 610.

In one embodiment, said rear spacer 612 can comprise a pin aperture 814 configured to receive said pin 604 with said bunk cleaner assembly 102 in said locked upper configuration 802. In one embodiment, said pin 604 can pass through one or both of said two side plates 606 at said pin aperture 702 and a portion of said pin aperture 814 to hold said scoop assembly 114 and said swing arm assembly 504 in a relatively fixed position with regard to one another.

Figure 9A:
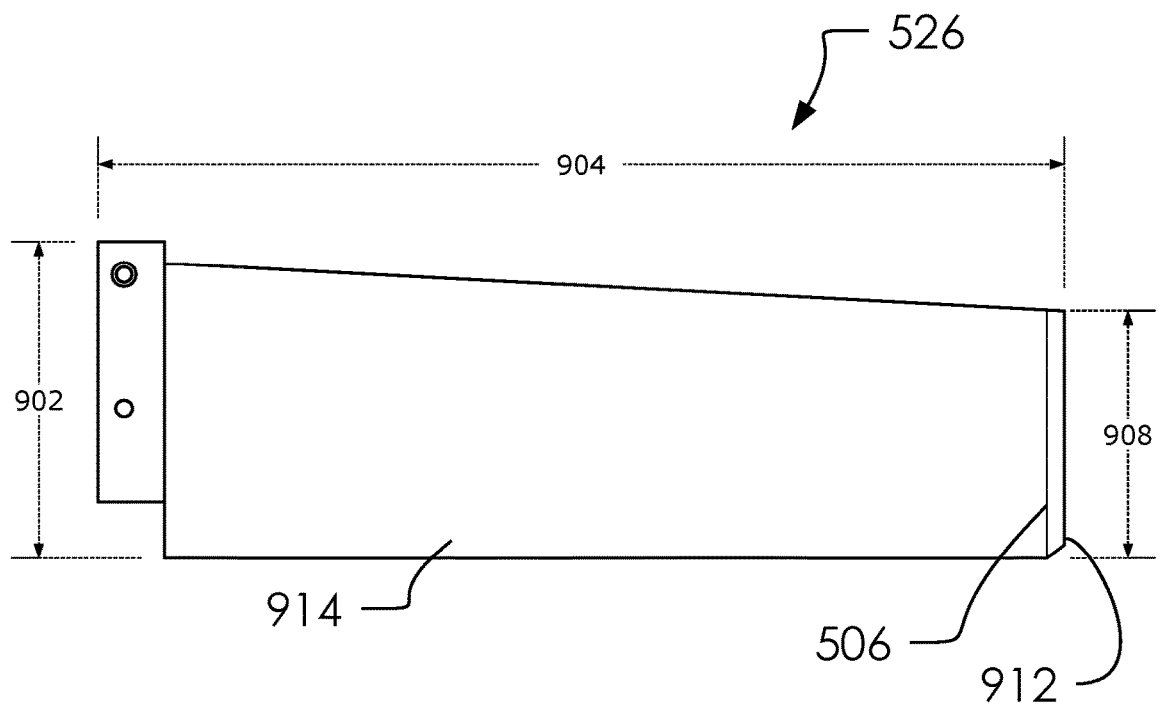
FIGS. 9A and 9B illustrate an elevated side view and elevated top view of a scoop portion 526.
Figure 9B:
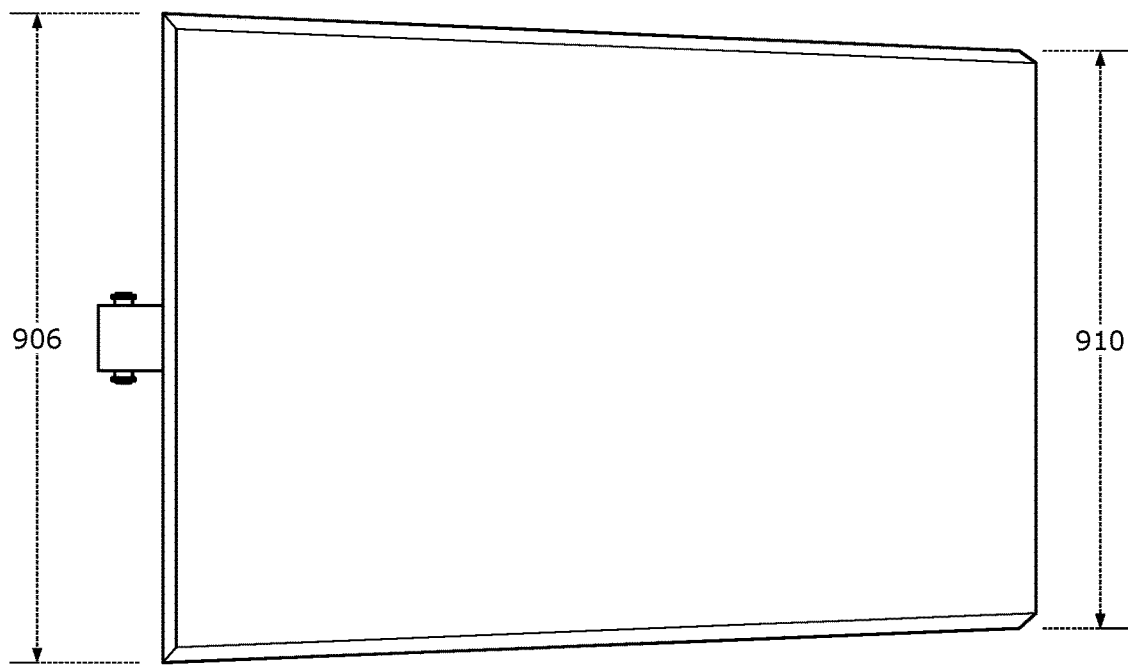

FIGS. 9A and 9B illustrate an elevated side view and elevated top view of said scoop portion 526.

Said scoop portion 526 can comprise a height 902, a length 904, a width 906, a first end height 908 and a first end width 910.

In one embodiment, said front edge 506 can come to a beveled edge 912 adapted for scraping said trough 106 when applied at an angle of attack, to be discussed herein.

In one embodiment, said scoop portion 526 can comprise a bottom surface 914 being substantially convex.

Figure 10A:
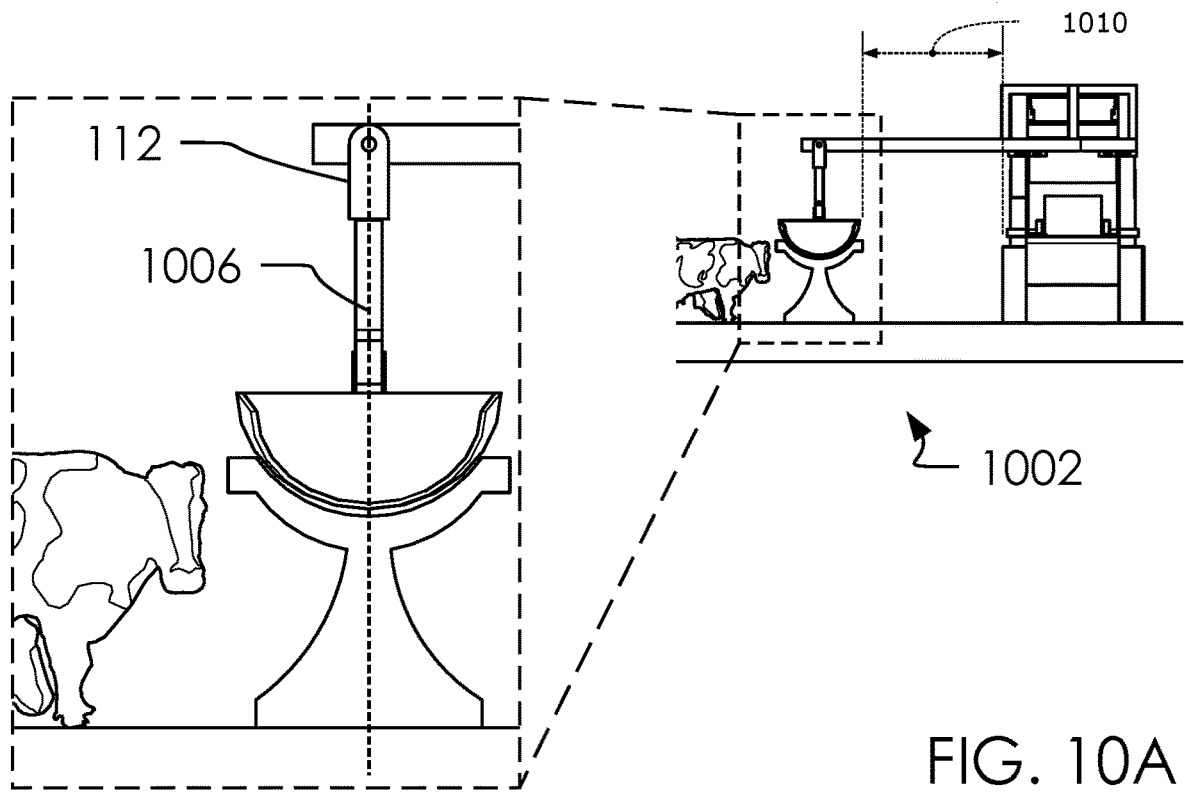
FIGS. 10A and 10B illustrate an elevated front view of a leveled configuration 1002 and an unleveled configuration 1004 of said swinging arm assembly 112.
Figure 10B:
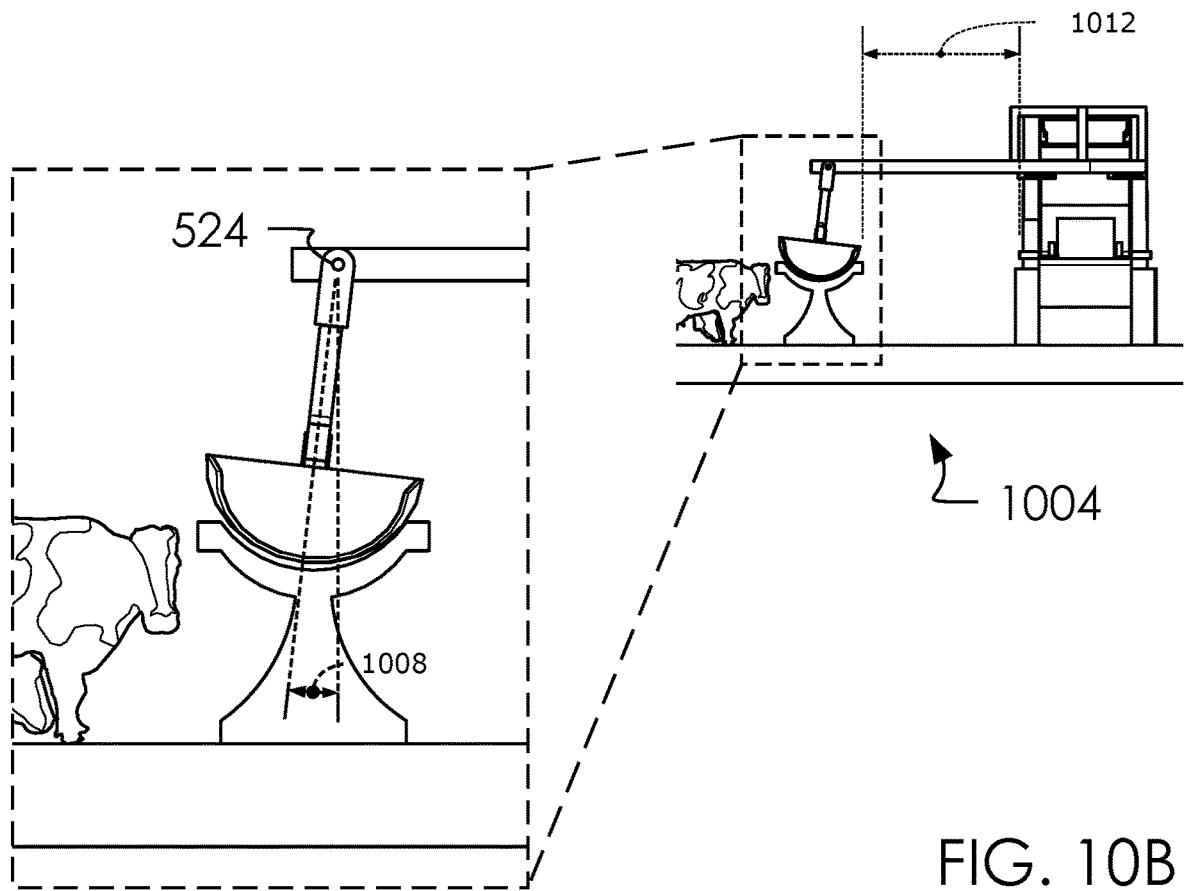

FIGS. 10A and 10B illustrate an elevated front view of a leveled configuration 1002 and an unleveled configuration 1004 of said swinging arm assembly 112.

In one embodiment, said swinging arm assembly 112 can swing within said swinging range of motion 528 on said swing axis 524, as discussed above. Herein, said leveled configuration 1002, and said unleveled configuration 1004 can comprise said swinging arm assembly 112 being a rotary displacement 1008 around said swing axis 524 from a vertical position 1006. Accordingly, said utility vehicle 116 can be positioned at an optimal distance 1010 relative to said feed bunk 104 (with said bunk cleaner assembly 102 in said vertical position 1006) or a non-optimal distance 1012 such as with said rotary displacement 1008. That is, said leveled configuration 1002 can comprise said swinging arm assembly 112 having a zero a rotary displacement 1008 around said swing axis 524; and said unleveled configuration 1004 can comprise said swinging arm assembly 112 having a non-zero a rotary displacement 1008 around said swing axis 524.

Figure 11:
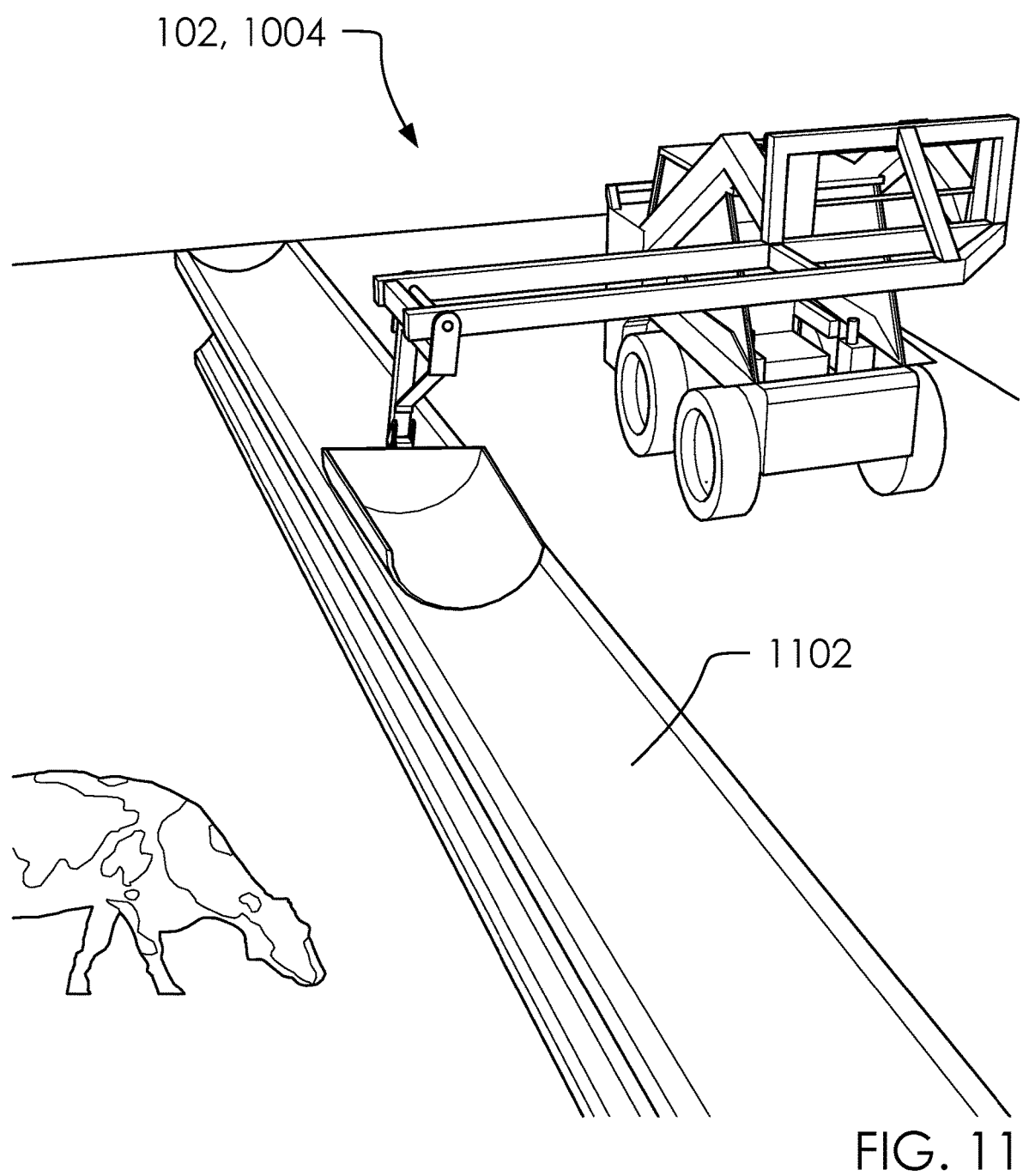
FIG. 11 illustrates a perspective overview of said unleveled configuration 1004.

FIG. 11 illustrates a perspective overview of said unleveled configuration 1004.

In one embodiment, said feed bunk 104 can comprise a j-bunk configuration 1102.

Figure 12:
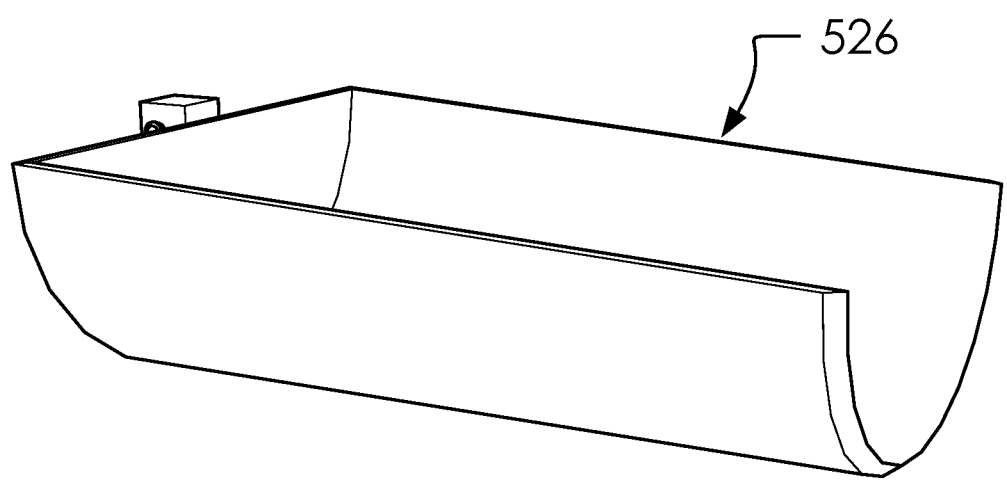
FIG. 12 illustrates a perspective overview of said scoop portion 526.

FIG. 12 illustrates a perspective overview of said scoop portion 526.

Said j-bunk configuration 1102 can comprise a substantially round said trough 106 which can require said scoop portion 526 to be substantially round or cylindrical on its bottom surface. By matching the profile of said trough 106 with said scoop portion 526, said bunk cleaner assembly 102 is adapted to clean out said trough 106 more completely.

Figure 13A:
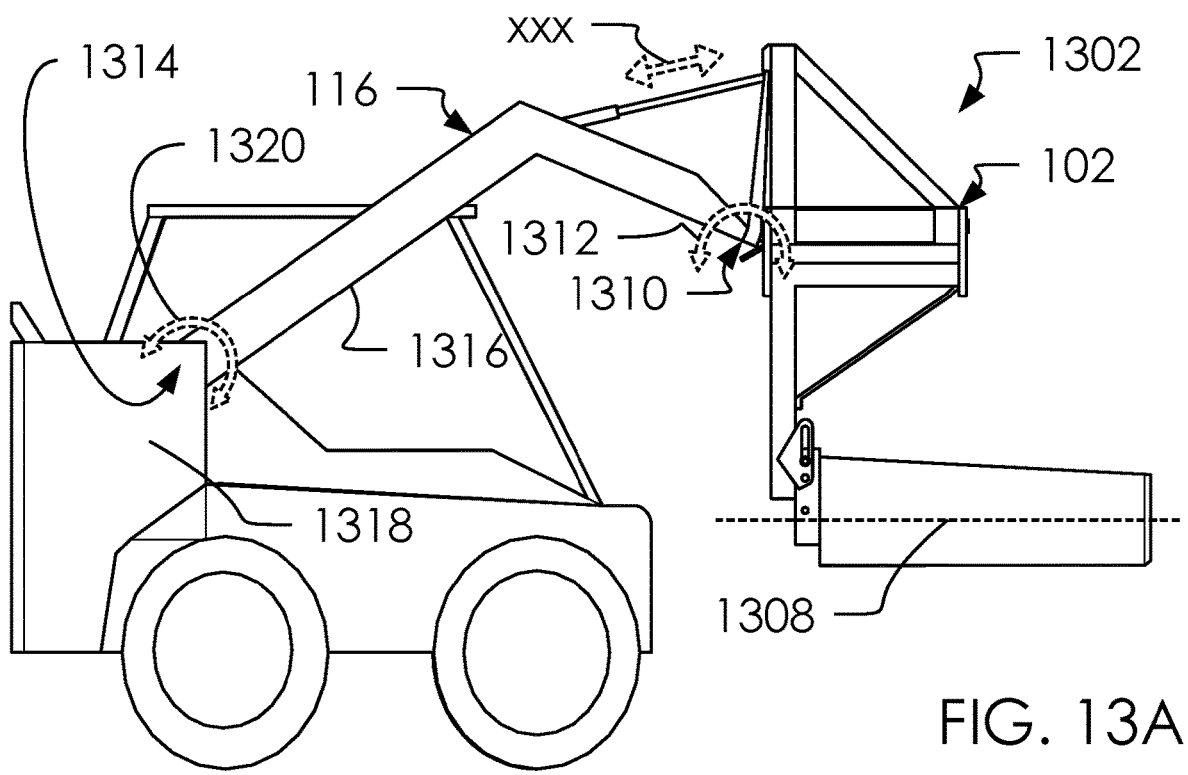
FIGS. 13A and 13B illustrate an elevated front view of said bunk cleaner assembly 102, and a utility vehicle 116 in a level pitch configuration 1302 and a downwardly pitched configuration 1304.
Figure 13B:
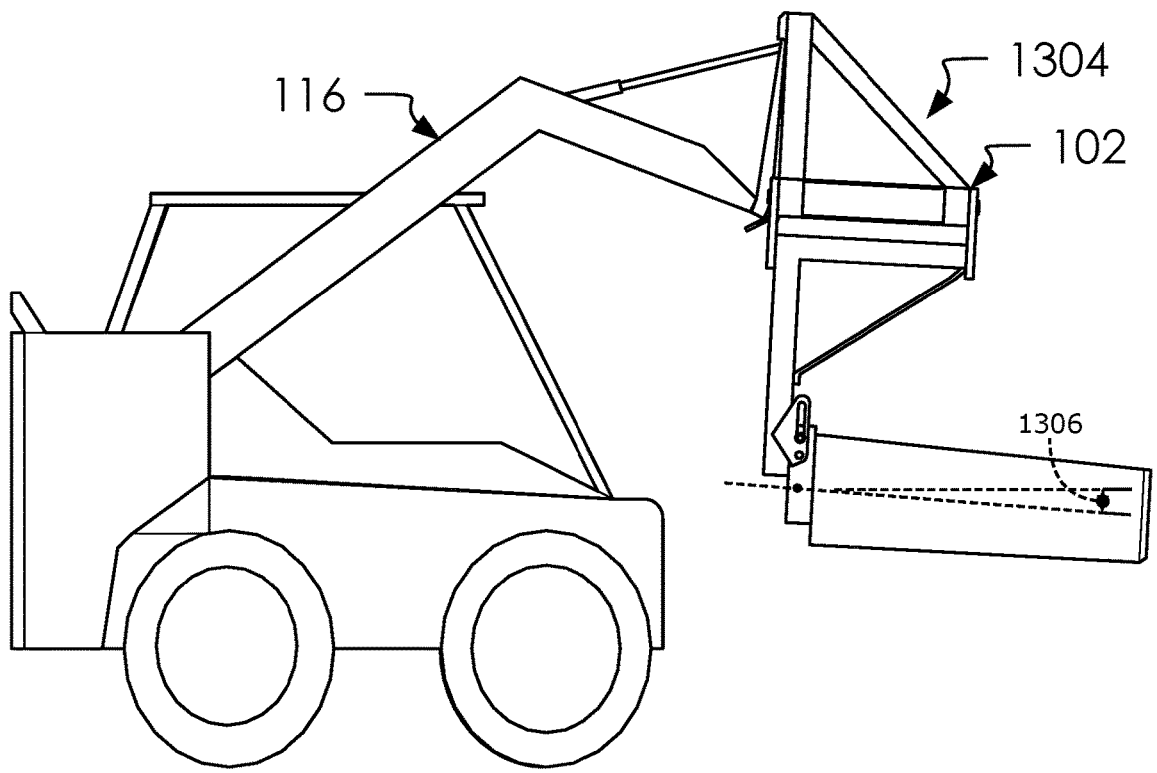

FIGS. 13A and 13B illustrate an elevated front view of said bunk cleaner assembly 102, and said utility vehicle 116 in a level pitch configuration 1302 and a downwardly pitched configuration 1304.

Said bunk cleaner assembly 102 can be adapted for altering a scoop pitch 1306 of said scoop assembly 114 relative to a level pitch 1308.

Said scoop pitch 1306 can rotate about a forward pitch axis 1310 being approximately where said one or more lower brackets 302 attach to said utility vehicle 116, and a rear pitch axis 1314 being at a joint between an arm 1316 and a chassis 1318 of said utility vehicle 116. In one embodiment, a forward pitch range of motion 1312 can be defined as a movement of said bunk cleaner assembly 102 around said forward pitch axis 1310; and a rear pitch range of motion 1320 can comprise a movement of said arm 1316 relative to said chassis 1318.

By adjusting said scoop pitch 1306, a user can use said front edge 506, and said beveled edge 912 to scrape debris from said trough 106 of said feed bunk 104. In one embodiment, rotating said bunk cleaner assembly 102 around said forward pitch axis 1310 can be accomplished by actuating pistons between a portion of said arm 1316 and said upper bracket 304, as is known in the art.

Figure 14A:
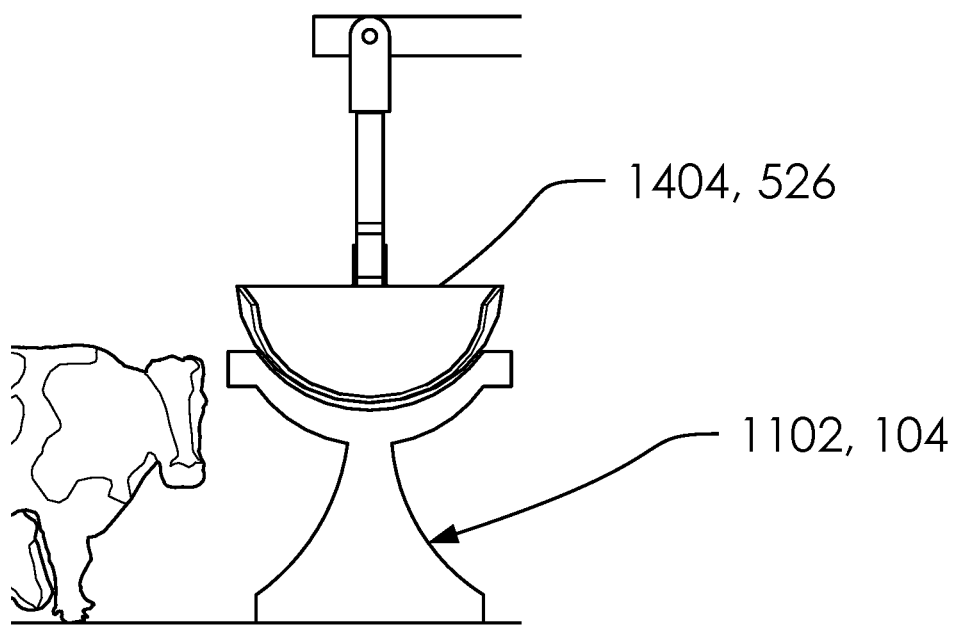
FIGS. 14A and 14B illustrate an elevated front view of said bunk cleaner assembly 102 as a j-bunk configuration 1102 and a flat bottom bunk configuration 1402.
Figure 14B:
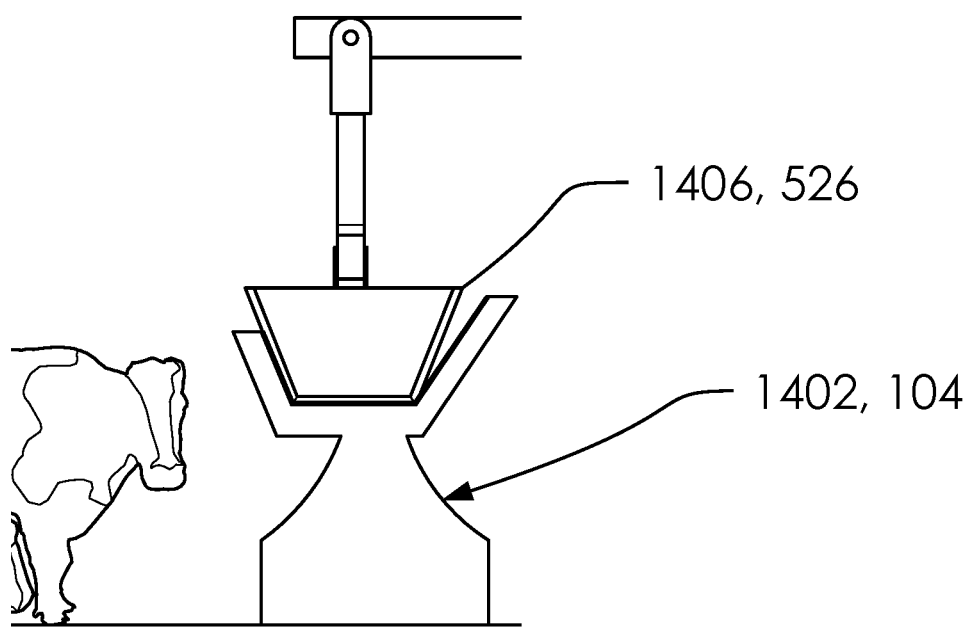

FIGS. 14A and 14B illustrate an elevated front view of said bunk cleaner assembly 102 as said j-bunk configuration 1102 and a flat bottom bunk configuration 1402.

In one embodiment, said feed bunk 104 can comprise various configurations, such as said j-bunk configuration 1102, and said flat bottom bunk configuration 1402, as is known in the art.

Accordingly, said scoop portion 526 can be fitted to more completely scrape said feed bunk 104. Thus, said scoop portion 526 can comprise a rounded scoop body 1404 and a flat bottom scoop body 1406.

Figure 15:
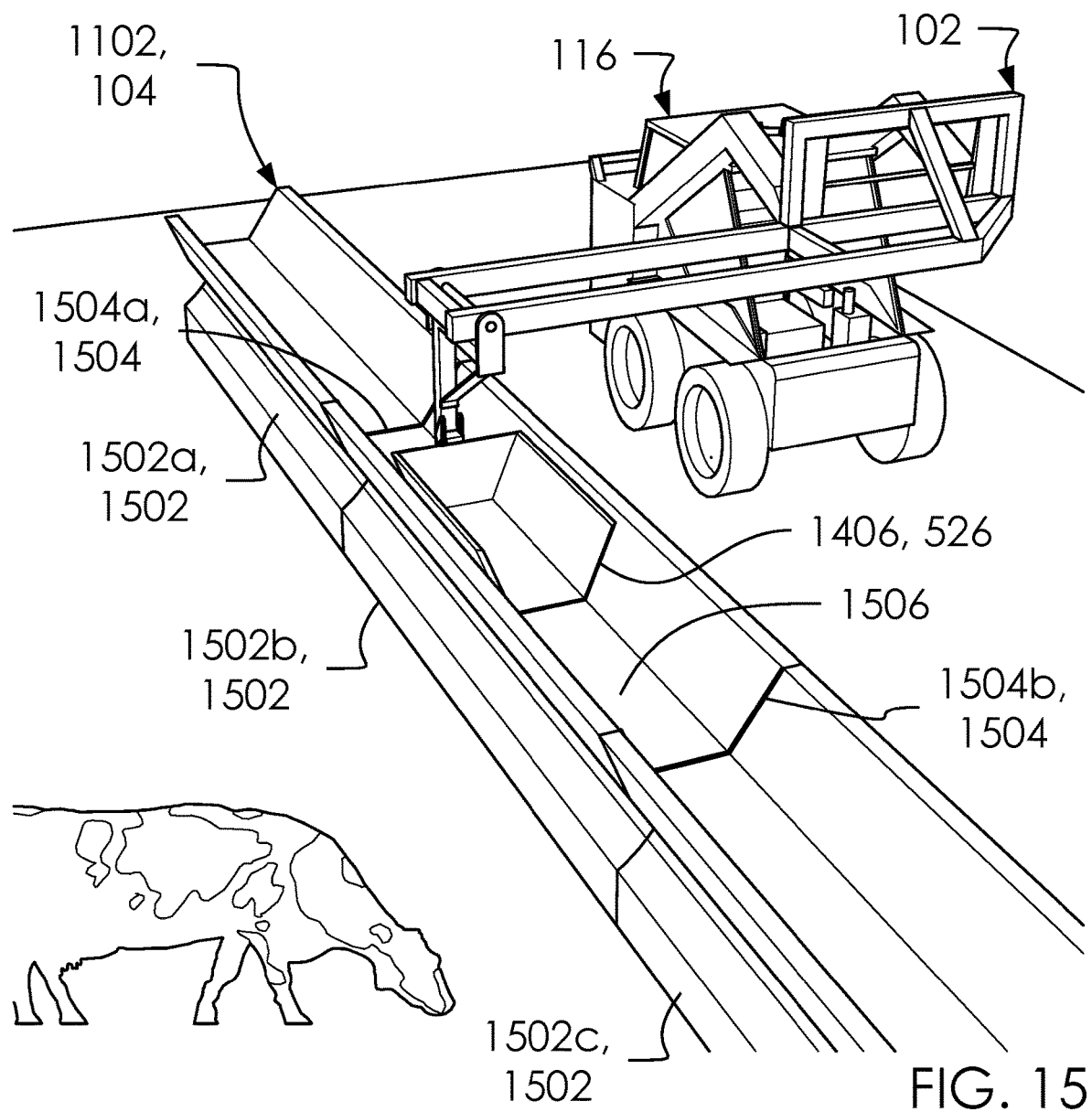
FIG. 15 illustrates a perspective overview of said flat bottom bunk configuration 1402 with a flat bottom scoop body 1406 affixed to said bunk cleaner assembly 102.

FIG. 15 illustrates a perspective overview of said flat bottom bunk configuration 1402 with said flat bottom scoop body 1406 affixed to said bunk cleaner assembly 102.

In one embodiment, said flat bottom bunk configuration 1402 can comprise two or more segments 1502 (which can comprise at least a first segment 1502a, a second segment 1502b, and a third segment 1502c, as illustrated). In one embodiment, said two or more segments 1502 can be attached to one another with a one or more bunk joints 1504 (which can comprise at least a first bunk joint 1504a, and a second bunk joint 1504b, as illustrated), as is known in the art.

In one embodiment, said one or more bunk joints 1504 can be raised bumps above a bunk floor 1506 of said flat bottom bunk configuration 1402 of said feed bunk 104.

Figure 16:
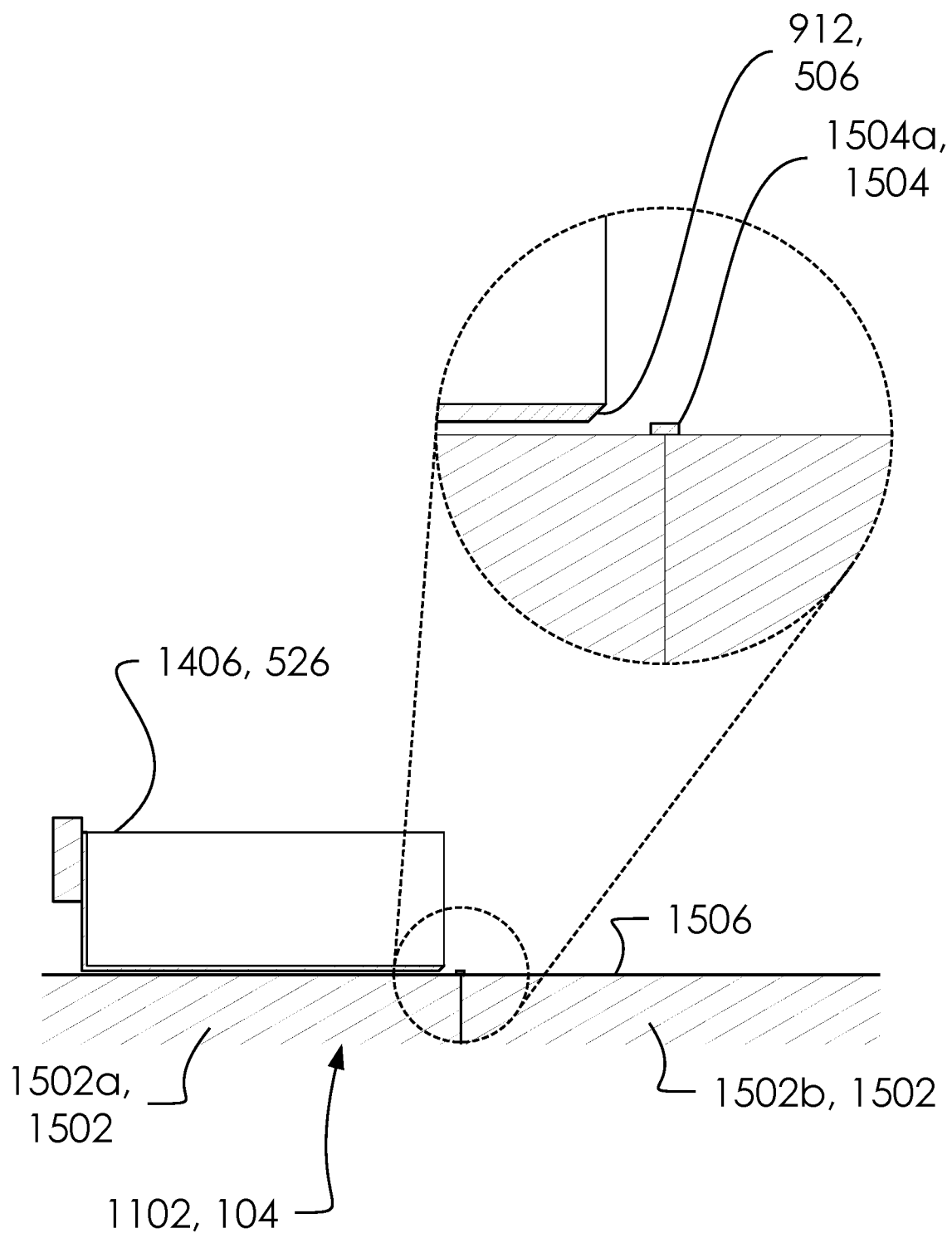
FIG. 16 illustrates an elevated front cross-section view of said flat bottom scoop body 1406 with said j-bunk configuration 1102.

FIG. 16 illustrates an elevated front cross-section view of said flat bottom scoop body 1406 with said j-bunk configuration 1102.

In one embodiment, said one or more bunk joints 1504 are raised above said bunk floor 1506 such that if said front edge 506 were not beveled, it might break as said front edge 506 collided with said one or more bunk joints 1504. Accordingly, said beveled edge 912 is configured to protect said bunk cleaner assembly 102, and said feed bunk 104. That is, said front edge 506 of said scoop portion 526 comprises said beveled edge 912 is configured to protect said bunk cleaner assembly 102 and said feed bunk 104 from said one or more bunk joints 1504 by minimizing direct collision between said front edge 506 with said one or more bunk joints 1504.

Figure 17:
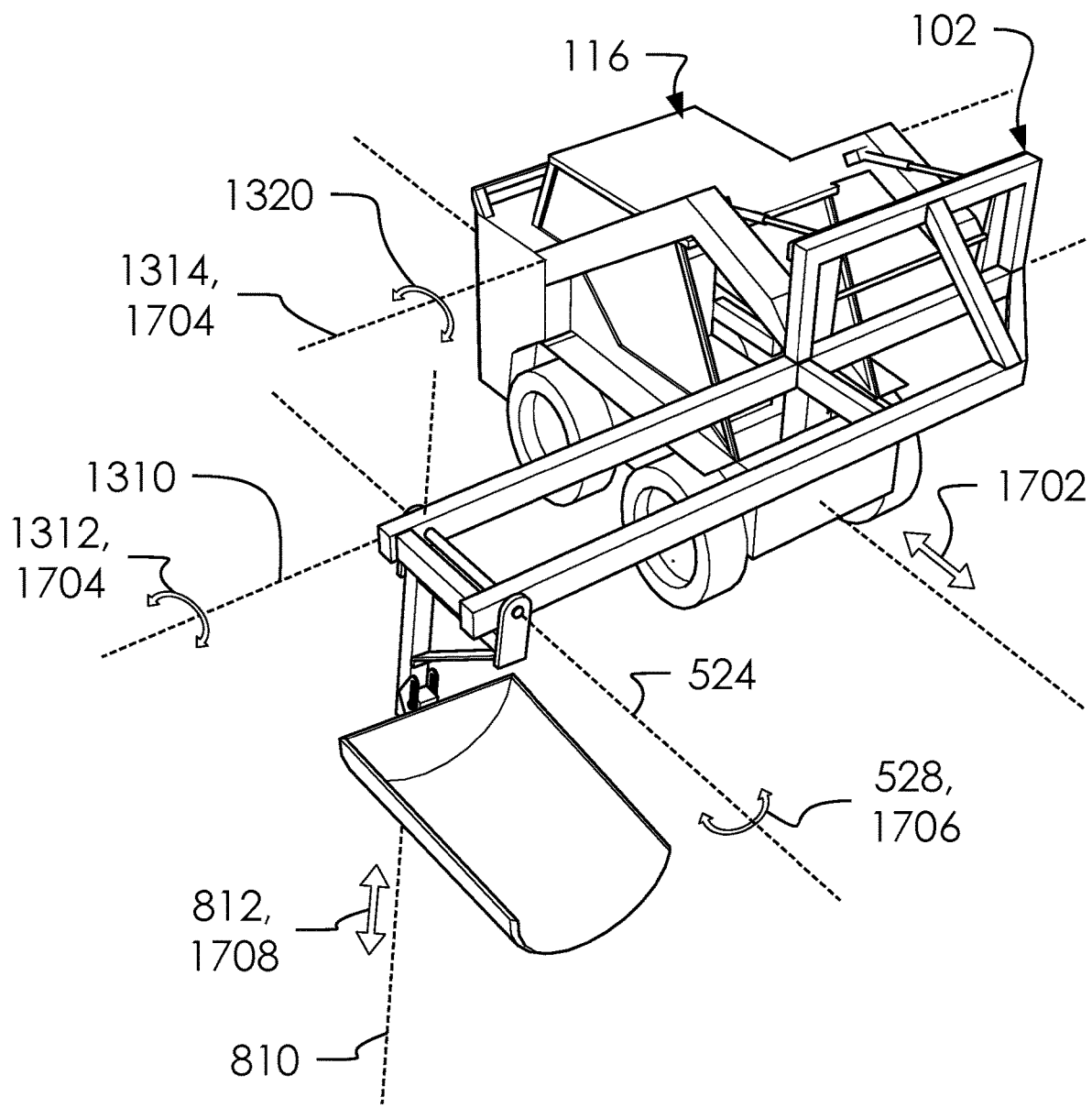
FIG. 17 illustrates a perspective overview of said bunk cleaner assembly 102 and said utility vehicle 116.

FIG. 17 illustrates a perspective overview of said bunk cleaner assembly 102 and said utility vehicle 116.

Shown in FIG. 17 are the motions allowed for by said bunk cleaner assembly 102; namely, said swinging range of motion 528, said forward pitch range of motion 1312, said rear pitch range of motion 1320, said vertical movement 812, and said direction of vehicle travel 1702.

Accordingly, said bunk cleaner assembly 102 can allow for a pitch 1704, a roll 1706 and a height adjustment 1708 to said scoop assembly 114 while moving along said direction of vehicle travel 1702.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A bunk cleaner assembly for selectively adjusting a pitch, a roll and a height adjustment of a scoop assembly for cleaning a trough of a feed bunk, wherein:
    said bunk cleaner assembly comprises a frame portion, a swinging arm assembly, said scoop assembly, and a utility vehicle;
    said frame portion is configured in attaching said swinging arm assembly and said utility vehicle to one another;
    said swinging arm assembly comprise a hinge assembly;
    said frame portion comprises a horizontal frame portion, a vertical frame portion, and a vehicle receiver bracket;
    said frame portion comprise a first end, and a second end;
    said hinge assembly attaches to said first end of said frame portion;
    said vehicle receiver bracket is at said second end of said frame portion;
    said frame portion further comprises said vehicle receiver bracket configured to selectively attach said frame portion to said utility vehicle;
    said frame portion is configured to extend said swinging arm assembly alongside of said utility vehicle and above said feed bunk;
    said swinging arm assembly comprises said hinge assembly, a swing arm assembly and a scoop portion;
    said hinge assembly is rotatably attached to said frame portion;
    said swing arm assembly connects said hinge assembly to said scoop portion and hangs substantially down from said hinge assembly;
    said scoop portion comprises a front edge, two sides, a scoop cavity and a back end;
    said scoop portion is configured to scoop debris from said trough of said feed bunk;
    said swinging arm assembly with said scoop assembly is configured to selectively rotate on a swing axis;
    said swinging arm assembly freely rotates around said swing axis through a swinging range of motion;
    said bunk cleaner assembly is configured to selectively change said roll with said swinging range of motion, said pitch with a forward pitch range of motion and a rear pitch range of motion, and
    said height adjustment with a vertical movement;
    said swinging arm assembly freely rotates around said swing axis through said swinging range of motion between a leveled configuration, and an unleveled configuration;
    said bunk cleaner assembly is adapted for altering a scoop pitch of said scoop assembly relative to a level pitch;
    said bunk cleaner assembly comprises a forward pitch axis and a rear pitch axis about which said scoop portion can be rotated to said scoop pitch;
    said forward pitch axis comprises a rotating axis where one or more lower brackets attach to said utility vehicle;
    said rear pitch axis comprises a rotating axis at a joint between an arm and a chassis of said utility vehicle;
    said forward pitch range of motion is defined as a movement of said bunk cleaner assembly around said forward pitch axis;
    said rear pitch range of motion comprises a movement of said arm relative to said chassis;

by adjusting said scoop pitch, said front edge with a beveled edge can be selectively adjusted to scrape debris from said trough of said feed bunk; and said swinging arm assembly comprises an adjustable vertical sliding assembly slidably attaching said swing arm assembly and said scoop assembly of said swinging arm assembly to one another along a vertical movement path to provide said vertical movement for said scoop assembly.

2. A bunk cleaner assembly for selectively adjusting a scoop assembly for cleaning a trough of a feed bunk, wherein:

said bunk cleaner assembly comprises a frame portion, a swinging arm assembly, said scoop assembly, and a utility vehicle;

said frame portion is configured in attaching said swinging arm assembly and said utility vehicle to one another;

said swinging arm assembly comprise a hinge assembly;

said frame portion comprises a horizontal frame portion, a vertical frame portion, and a vehicle receiver bracket;

said frame portion comprise a first end, and a second end;

said hinge assembly attaches to said first end of said frame portion;

said vehicle receiver bracket is at said second end of said frame portion;

said frame portion further comprises said vehicle receiver bracket configured to selectively attach said frame portion to said utility vehicle;

said frame portion is configured to extend said swinging arm assembly alongside of said utility vehicle and above said feed bunk;

said swinging arm assembly comprises said hinge assembly, a swing arm assembly and a scoop portion;

said hinge assembly is rotatably attached to said frame portion;

said swing arm assembly connects said hinge assembly to said scoop portion and hangs substantially down from said hinge assembly;

said scoop portion comprises a front edge, two sides, a scoop cavity and a back end;

said scoop portion is configured to scoopdebris from said trough of said feed bunk;

said swinging arm assembly with said scoop assembly is configured to selectively rotate on a swing axis; and said swinging arm assembly freely rotates around said swing axis through a swinging range of motion.

3. The bunk cleaner assembly of claim 2, wherein:

said frame portion comprises said horizontal frame portion;

said horizontal frame portion comprises two or more bars and two or more support bars;

said two or more bars comprise at least a first bar and a second bar;

said two or more support bars comprise at least a first support bar and a second support bar;

said two or more bars and said two or more support bars are connected to one another to form a truss for extending said frame portion alongside of said utility vehicle;

said two or more bars are parallel to one another and arranged in a substantially horizontal plane;

two axis aperture holes comprise apertures in said first end of said frame portion; and said two axis aperture holes are aligned to receive a portion of said hinge assembly of said swinging arm assembly.

4. The bunk cleaner assembly of claim 2, wherein:

said two axis aperture holes are aligned with one another at said first end of said frame portion; and an upper horizontal bar is attached at said second end of said frame portion.

5. The bunk cleaner assembly of claim 2, wherein:

said upper horizontal bar are attached at said second end of said frame portion.

6. The bunk cleaner assembly of claim 2, wherein:

as viewed from said first end, said frame portion forms an "L" shape with said horizontal frame portion, and said vertical frame portion forming the two parts of the "L".

7. The bunk cleaner assembly of claim 2, wherein:

said swing axis comprises a hinge bar of said swinging arm assembly attached to said two axis aperture holes of said frame portion.

8. The bunk cleaner assembly of claim 2, wherein:

said hinge assembly comprises said hinge bar and two end caps;

said two end caps comprise a first end cap and a second end cap; and said hinge bar sides through said two axis aperture holes and is held at its ends with said two end caps.

9. The bunk cleaner assembly of claim 2, wherein:

said swing axis is aligned with a direction of vehicle travel of said utility vehicle.

10. The bunk cleaner assembly of claim 2, wherein:

said swinging arm assembly freely rotates around said swing axis through said swinging range of motion between a leveled configuration, and an unleveled configuration;

said leveled configuration comprises said swinging arm assembly having a zero a rotary displacement around said swing axis;

said unleveled configuration comprises said swinging arm assembly having a non- zero a rotary displacement around said swing axis;

where said utility vehicle is positioned at an optimal distance relative to said feed bunk, said swinging arm assembly is in said leveled configuration; and otherwise, where said utility vehicle is positioned a non-optimal distance, said swinging arm assembly is in said unleveled configuration.

11. The bunk cleaner assembly of claim 2, wherein:

said bunk cleaner assembly is adapted for altering a scoop pitch of said scoop assembly relative to a level pitch.

12. The bunk cleaner assembly of claim 11, wherein:

said bunk cleaner assembly comprises a forward pitch axis and a rear pitch axis about which said scoop portion can be rotated to said scoop pitch;

said forward pitch axis comprises a rotating axis where one or more lower brackets attach to said utility vehicle;

said rear pitch axis comprises a rotating axis at a joint between an arm and a chassis of said utility vehicle;

a forward pitch range of motion is defined as a movement of said bunk cleaner assembly around said forward pitch axis;

a rear pitch range of motion comprises a movement of said arm relative to said chassis; and by adjusting said scoop pitch, said front edge with a beveled edge can be selectively adjusted to scrape debris from said trough of said feed bunk.

13. The bunk cleaner assembly of claim 12, wherein:

rotating said bunk cleaner assembly around said forward pitch axis is accomplished by actuating pistons between a portion of said arm and an upper bracket.

14. The bunk cleaner assembly of claim 2, wherein:
said frame portion comprises said horizontal frame portion, said vertical frame portion and said two axis aperture holes;
said horizontal frame portion comprises said two or more bars and said two or more support bars;
said two or more bars comprise at least said first bar and said second bar;
said two or more support bars comprise at least said first support bar and said second support bar;
said vertical frame portion comprises a portion of said first bar and said upper horizontal bar;
said horizontal frame portion and said vertical frame portion are supported and connected to one another with a transverse support bar; and
said upper horizontal bar and said second bar are substantially parallel with one another and perpendicular to a vertical support bars.

15. The bunk cleaner assembly of claim 2, wherein:
said vehicle receiver bracket comprises said one or more lower brackets and said upper bracket;
said frame portion comprises a front and a back; and
said vehicle receiver bracket is attached to said back of said vertical frame portion of said frame portion.

16. The bunk cleaner assembly of claim 2, wherein:
said swinging arm assembly comprises an adjustable vertical sliding assembly slidably attaching said swing arm assembly and said scoop assembly of said swinging arm assembly to one another along a vertical movement path to provide a vertical movement for said scoop assembly;
said adjustable vertical sliding assembly comprises two side plates each having an upper elongated slot;
said two side plates comprises a first side plate, and a second side plate;
said scoop assembly comprises a rear spacer and said scoop portion;
said scoop portion comprises a back side;
said rear spacer comprises two side fasteners;
said scoop portion slidably attaches to said swing arm assembly with said two side fasteners and said two side plates;
said two side plates each comprise a front portion, and a rear portion;
said rear portion of said two side plates each attach to said swing arm assembly;
said front portion of said two side plates each extend forward from said swing arm assembly toward said back side of said scoop portion or said scoop assembly;
said front portion of said two side plates each comprise said upper elongated slot;
said upper elongated slot is substantially vertical;
said upper elongated slot receives a portion of said two side fasteners;
said upper elongated slot comprises an upper end and a lower end; and
said two side plates with said upper elongated slot are configured to hold a portion of said two side fasteners and allow said scoop assembly to slide with said vertical movement along said vertical movement path defined by said upper elongated slot as said two side fasteners slide therethrough.

17. The bunk cleaner assembly of claim 16, wherein:
each of said two side plates comprises said upper elongated slot, a pin aperture;
said rear spacer comprises a pin aperture configured to selectively receive a portion of a pin;
said bunk cleaner assembly comprises a locked upper configuration;
said bunk cleaner assembly further comprises said pin; and
said locked upper configuration comprises said pin passing through one or both of said two side plates at said pin aperture and a portion of said pin aperture to hold said scoop assembly and said swing arm assembly in a relatively fixed position with regard to one another.

18. The bunk cleaner assembly of claim 17, wherein:
said swinging arm assembly comprises said locked upper configuration with a locked height and an unlocked lower configuration with a maximum height;
said locked upper configuration comprises said two side fasteners at said upper end of said upper elongated slot, and said pin in said pin aperture;
said unlocked lower configuration comprises said scoop assembly slid all the way down with said two side fasteners at said lower end of said upper elongated slot; and
said scoop assembly has vertical movement freedom with said pin removed from said pin aperture since said swinging arm assembly and said scoop assembly freely move relative to one another.

19. The bunk cleaner assembly of claim 16, wherein:
said swinging arm assembly comprises a spacer gap between said two side plates;
said two side plates each comprise said front portion, and said rear portion; and
said two side plates can attach on either side of said swing arm assembly with said rear portion and said front portion can extend out on either side of said spacer gap.

20. The bunk cleaner assembly of claim 2, wherein:
said front edge of said scoop portion comprises said beveled edge adapated for scraping said trough of said feed bunk.

21. The bunk cleaner assembly of claim 2, wherein:
said scoop portion is fitted with a rounded scoop body to more completely scrape said feed bunk when said feed bunk comprises a j-bunk configuration;
said j-bunk configuration comprises said trough having a bunk floor being a substantially concave; and
said rounded scoop body comprises said scoop portion having a bottom surface being substantially convex.

22. The bunk cleaner assembly of claim 2, wherein:
said scoop portion is fitted with a flat bottom scoop body to more completely scrape said feed bunk when said feed bunk comprises a flat bottom bunk configuration; and
said flat bottom bunk configuration comprises said feed bunk having a substantially planar surface for said bunk floor.

23. The bunk cleaner assembly of claim 2, wherein:
said front edge of said scoop portion comprises said beveled edge configured to protect said bunk cleaner assembly and said feed bunk from a one or more bunk joints by minimizing direct collision between said front edge with said one or more bunk joints on said bunk floor;
wherein, said feed bunk comprises
two or more segments joined to one another by said one or more bunk joints,
said two or more segments comprise at least a first segment, and a second segment,
said one or more bunk joints comprise at least a first bunk joint,
said feed bunk comprises said bunk floor, and said one or more bunk joints are raised bumps above said bunk floor of said feed bunk.

24. The bunk cleaner assembly of claim 2, wherein:

said bunk cleaner assembly is configured to selectively change
- a roll with said swinging range of motion,
- a pitch with said forward pitch range of motion and said rear pitch range of motion, and
- a height adjustment with said vertical movement;

said swinging arm assembly freely rotates around said swing axis through said swinging range of motion between said leveled configuration, and said unleveled configuration;

said bunk cleaner assembly is adapted for altering said scoop pitch of said scoop assembly relative to said level pitch;

said bunk cleaner assembly comprises said forward pitch axis and said rear pitch axis about which said scoop portion can be rotated to said scoop pitch;

said forward pitch axis comprises a rotating axis where said one or more lower brackets attach to said utility vehicle;

said rear pitch axis comprises a rotating axis at a joint between said arm and said chassis of said utility vehicle;

said forward pitch range of motion is defined as a movement of said bunk cleaner assembly around said forward pitch axis;

said rear pitch range of motion comprises a movement of said arm relative to said chassis;

by adjusting said scoop pitch, said front edge with said beveled edge can be selectively adjusted to scrape debris from said trough of said feed bunk; and said swinging arm assembly comprises said adjustable vertical sliding assembly slidably attaching said swing arm assembly and said scoop assembly of said swinging arm assembly to one another along said vertical movement path to provide said vertical movement for said scoop assembly.

* * * * *